United States Patent [19]

McCullough, Jr. et al.

[11] Patent Number: 4,844,974
[45] Date of Patent: Jul. 4, 1989

[54] ANTISTATIC, ANTISLOSH, FLAME ARRESTING STRUCTURE FOR USE IN CONTAINERS HOLDING FLAMMABLE FLUIDS

[75] Inventors: Francis P. McCullough, Jr., Lake Jackson; R. Vernon Snelgrove, Damon, both of Tex.; Eckel R. Lane, Midland, Mich.; David M. Hall, Auburn, Ala.

[73] Assignee: The Dow Chemical Company, Midland, Mich.

[21] Appl. No.: 122,141

[22] Filed: Nov. 18, 1987

[51] Int. Cl.$^4$ .............................................. D04H 1/58
[52] U.S. Cl. .................................... 428/288; 428/224; 428/297; 428/902; 428/903; 428/920; 428/408
[58] Field of Search ............... 428/224, 288, 297, 902, 428/903, 920, 408

[56] References Cited

U.S. PATENT DOCUMENTS 4,412,675  11/1983  Kawakubo ........................ 267/167
4,631,118  12/1986  McCullough et al. .............. 204/16
4,643,931   2/1987  McCullough, Jr. et al. ......... 428/97

OTHER PUBLICATIONS

U.S. patent application Ser. No. 856,305, McCullough, Jr. et al., Carbonaceous Fibers with Spring-Like Reversible Deflection and Method of Manufacture, filed Apr. 16, 1986.
U.S. patent application Ser. No. 003,973, McCullough, Jr. et al., Improved Method and Materials for Manufacture of Antistatic Carpet and Backing, filed Jan. 16, 1987.
U.S. patent application Ser. No. 918, 738, McCullough, Jr. et al., Thermal Insulation, filed Oct. 14, 1986.

Primary Examiner—James J. Bell
Attorney, Agent, or Firm—John Lezdey; Joe R. Prieto

[57] ABSTRACT

An antislosh, flame arresting structure for use in or with containers holding flammable fluids comprising a multiplicity of heat set carbonaceous fibers having an LOI value greater than 40 in an amount effective for preventing sloshing of the fluids and capable of arresting a flame front.

25 Claims, 2 Drawing Sheets

ANTISTATIC, ANTISLOSH, FLAME ARRESTING STRUCTURE FOR USE IN CONTAINERS HOLDING FLAMMABLE FLUIDS

CROSS REFERENCE TO RELATED APPLICATIONS

This Application is related to copending U.S. Patent Application Ser. No. 856,305, entitled CARBONACEOUS FIBERS WITH SPRING LIKE REVERSIBLE DEFLECTION AND METHOD OF MANUFACTURE, filed Apr. 28, 1986, by McCullough, et al., which is a continuation-in-part of U.S. Patent Application Ser. No. 827,567, entitled NOVEL FABRIC AND FIBER, filed Feb. 10, 1985, by McCullough, et al., now abandoned, which is a continuation-in-part of U.S. Patent Application Ser. No. 724,440, entitled NOVEL FABRIC AND FIBER, filed Apr. 18, 1985, by McCullough,; et al. and copending U.S. Patent Application Ser. No. 918,738, entitled THERMAL INSULATION, filed Oct. 14, 1986 by McCullough, et al. All of the above-identified applications are incorporated herein by reference.

FIELD OF THE INVENTION

The present invention relates to an antistatic, antislosh, flame arresting structure for use in conjunction with containers holding flammable fluids. More particularly, the invention is concerned with resilient shape reforming lightweight nonflammable structures of carbonaceous materials having the ability to control or stop fuel flow and slosh, act as a flame arrester and prevent and/or dissipate the buildup of static electricity. The structures are further characterized by having good chemical and hydrolytic inertness and are stable to long periods of exposure to the flammable fluids.

BACKGROUND OF THE INVENTION

For many years people who handle and use flammable fluids such as fuels, large volume chemicals or intermediates have been faced with the serious potential hazards of fire and explosion due to static buildup during filling or unloading of containers such as tanks, due to triboelectric generated discharge, or due to sloshing of the liquids to and fro in tanks during the tank's transportation. Transporting tanks which partially contain flammable fluids, or which contain a small amount of fluid to the extent that the tank is essentially empty, poses the additional hazard of detonation of the fluid due to sparking or static electric discharge caused by the sloshing of the fluids inside the tank. Methods used to prevent sparking and/or static discharge in the tanks include padding the tanks with an inert gas or adding a flame arresting system to the tanks. In addition, physical grounding has been the customary technique for reducing this hazard, however, this technique has not eliminated the problem completely. In addition, human error and poor connections have led to explosions resulting in loss of human life and equipment.

Recently, some containers have been filled with a reticulated open cell polymeric foam in an effort to eliminate the above problems and hazards. One class of foam used heretofore is a polyether urethane which has good chemical resistance, but which has poor static dissipating properties and is flammable in the presence of air. A flame would be present if a container with the polyether urethane foam was to rupture. The other class of foam used heretofore is a polyester urethane which has fairly good static dissipating properties, but has poor hydrolytic properties, poor solvent stability and is also fairly flammable in air. Both of the above classes of foams lose structural properties when exposed to hydrocarbon fuels over a period of time and thus must be replaced regularly.

However, mere sloshing is not the only source of static buildup, and therefore the control of sloshing and, in turn, the control of the static buildup created by the sloshing, alone, does not solve the other problems encountered in tank usage. For example, since such foam materials are not good conductors, they do not discharge a static buildup such as that generated during filling and emptying the container. In addition, such foams are weak structurally and exhibit slow degradation in the presence of most flammable fluids, especially hydrocarbon liquids. This instability problem is increased when small amounts of moisture are present in the container and contact the foam. Another problem frequently encountered in the use of containers with flammable fluids, is cracking or rupturing of the containers due to impact or material fatigue. A crack or rupture in a container will allow flammable fluids to freely escape and pose a dangerous and hazardous condition.

While some success has been obtained by the use of the above-mentioned foams, it would be advantageous for the industry to have a material which, in addition to preventing sloshing, is stable in the presence of flammable fluids, exhibits high electrical conductivity sufficient to dissipate static buildup, and acts as a flame arrester in instances where a spark occurs. Further, it is desirable to have a novel material which is substantially flame resistant and has the capability, when used as a container liner, of greatly retarding the escape of a flammable liquid from the container should the container leak or rupture. Such a novel material is described hereinafter in the accompanying specification and examples.

SUMMARY OF THE INVENTION

In accordance with the present invention there is provided a light weight, nonflammable structure in the form of a batting, fluff, web or the like, comprising of a multiplicity of heat set carbonaceous fibers, wherein said fibers are nonlinear and/or linear, and which possess excellent antistatic, antisloshing, and flame arresting properties. Advantageously, the structure comprises a multiplicity of resilient carbonaceous or carbon fibers having a sinusoidal or coil like shape, a reversible deflection of at least about 1.2:1, an aspect ratio (l/d) greater than 10:1, and a LOI (Limiting Oxygen Index) of greater than 40. Preferably, the structures have a bulk density of about 0.15 to about 0.5 lb/ft$^3$ (2.4–8.0 kg/m$^3$) or less.

The present invention is specifically concerned with structures comprising a multiplicity of nonflammable carbonaceous or carbon filaments containing at least 65% carbon such as described in copending application Ser. No. 856,305 which are particularly identified by the degree of carbonization and/or their degree of electrical conductivity in the determination of the particular use for which they are most suited.

In accordance with one embodiment of the invention, the carbonaceous filaments which are utilized in flame arresting and antislosh applications are comprised of nonelectrically conductive filaments which are formed by the partial carbonization of stabilized acrylic fiber or fabric or some other stabilized carbon fiber precursor under conditions to impart a nonlinear or sinusoidal configuration as will be hereinafter described. The filaments are further characterized by their wool like fluffy appearance and texture when formed into nonwoven mats or batting. As will become apparent, the greater the amount of coil-like filaments present in the structure, the greater will be the wool-like texture and resilience. The fibers may be blended with noncarbonaceous fibers or carbonaceous linear fibers.

The term nonconductive as utilized in the present application relates to a resistance of greater than $10^7$ ohms per inch on a 6K tow formed from fibers having a diameter of 7–20 microns. When the precursor fiber is an acrylic fiber, it has been found that a nitrogen content of 18.8% or more results in a nonconductive fiber.

In accordance with a second embodiment of the invention, the nonlinear carbonaceous filaments which are utilized in the structures of the invention comprise carbonaceous filaments having a low degree of electrical conductivity and a carbon content of less than 85%. Preferably, the carbonaceous fibers are derived from stabilized acrylic fibers and possess a percent nitrogen content of from about 10 to about 20% for the case of a copolymer acrylic fiber, with a maximum content of as high as 35% for a terpolymer acrylic fiber, most preferably from about 16 to about 18.8%. The larger the amount of carbon content of the fibers utilized, the higher the degree of electrical conductivity. These high carbon filaments still retain a wool like appearance when formed into a mat or a batting especially when the majority of the fibers are nonlinear like. Also, as will become apparent, the greater the percentage of coil like fibers in the structure, the greater is the resiliency of the structure. As a result of the greater carbon content, the structures prepared with these filaments have greater static dissipating and antislosh properties and result in effective flame arresters even at higher temperatures of use. Low conductivity means that a 6K tow of fibers has a resistance of about $10^7$–$10^4$ ohms per inch.

In accordance with a third embodiment of the invention, the nonlinear carbonaceous or carbon filaments which are utilized in the antislosh and/or flame arresting structures of the invention have a carbon content of at least 85%. Preferably, the filaments which are utilized are derived from stabilized acrylic fibers and have a nitrogen content of less than 15%. As a result of the still higher carbon content, the structures prepared are more electrically conductive. That is, the resistance is less than $10^4$ ohms per inch. These fibers can be utilized in place of conventional straight or linear carbon fibers. Moreover, the coil like carbonaceous or carbon filaments, when formed into a structure such as a mat or batting, provide a better ability to electrically ground and thus prevent any static or spark generation. A structure containing the greater amount of the coil like fibers than sinusoidal or linear fibers provides the more effective barrier against the spread of flame fronts.

In accordance with a fourth embodiment of the intention, linear heat set carbonaceous filaments which are utilized in antistat, antislosh and/or flame arresting applications are comprised of low electrically conductive filaments, formed from the same stabilized precursor material as the nonlinear filaments with the exception that the heat setting (thermosetting) is done with the fiber precursor material held in a linear configuration, blended with and at least partially bonded to nonlinear thermoplastic or thermoset fibers or fiber blends in the form of a fluff, batting web, or the like.

In accordance with a further embodiment of the present invention, an open web is provided consisting of a randomly entangled coil like or sinusoidal configured fibers of carbonaceous material as herein defined. The web is of a sufficient structural strength to maintain its open web shape in the presence of flammable fluids such as liquid hydrocarbons and thus prevent sloshing of the liquids as well as to be substantially nonpacking. Various degrees of structural rigidity and stiffness of the web can be obtained by bonding or curing thermoplastic or thermoset material in the web. In addition the product is fire or flame resistant and effectively acts as a wick and a flame block to prevent the mass of fluid material entrapped in the mass from rapidly spilling out, thus reducing the chance of explosion. The tightness of the web of the invention can be varied such as to provide a marked holdup of liquid or of a looseness such as to permit a high rate of flow, when such is a major factor in the handling or use. The web may also be fixed in its desired form and/or shape by cementing the juxtapositioned fibers one to the other leaving the web still very open, but of a more stable, less compressible body under load.

If desired, the structure may comprise a thermoplastic or thermoset polymeric fiber or fiber blend such as polyester or a blend of high melting polyester with a smaller content or lower melting polyester binder fiber and linear carbonaceous fibers in order to provide densification and/or some rigidity and integrity to the structure. It also is desirous for this structure to have sufficient carbonaceous fibers present to provide flame retardant properties.

DESCRIPTION OF THE PREFERRED EMBODIMENTS

The antislosh, flame arresting and/or antistat web structures of the invention comprise a batting formed from nonflammable resilient carbonaceous fibers, preferably, those fibers which are nonlinear and posses a reversible deflection ratio of greater than about 1.2:1 and an aspect ratio (1/d) of greater than 10:1. The carbonaceous fibers may possess a sinusoidal or a coil like configuration or a more complicated structural combination of the two.

The fibers of the invention according to the test method of ASTM D 2863-77 have a LOI value greater than 40. The test method is also known as "oxygen index" or "limited oxygen index" (LOI).

Such carbonaceous fibers are prepared by heat treating a suitable stabilized precursor material such as that derived from an assembly of stabilized polyacrylonitrile based materials or pitch base (petroleum or coal tar) or other polymeric materials which can be made into a nonlinear fiber or filament structures or configurations and are thermally stable.

For example, in the case of polyacrylonitrile (PAN) based fiber, the fibers are formed by melt or wet spinning a suitable fluid of a precursor material having a normal nominal diameter of from about 4 to 25 micrometers. The precursor material is collected as an assembly of a multiplicity of continuous filaments in tows and stabilized (by oxidation in the case of PAN based fibers) in the conventional manner. The stabilized tows (or staple yarn made from chopped or stretch broken fiber staple) may thereafter, in accordance with the present invention, formed into a nonlinear or sinusoidal form by knitting the tow or yarn into a fabric or cloth (recognizing that other fabric forming and coil forming methods can be employed). The so formed knitted fabric or cloth is thereafter heat treated, in a relaxed and unstressed condition, at a temperature of from about 525 to about 750 degrees C., in an inert atmosphere for a period of time to produce a heat induced thermoset reaction wherein additional crosslinking and/or a cross-chain cyclization reaction occurs between the original polymer chain. At the lower temperature range of from about 150 to about 525 degrees C., the fibers are provided with a varying proportion of temporary to permanent set while in the upper range of temperatures of from 525 degrees C. and above, the fibers are provided with a permanent set. It is understood that other methods of shape formation such as crimping and coiling combined with thermosetting can be used.

Figure 1:
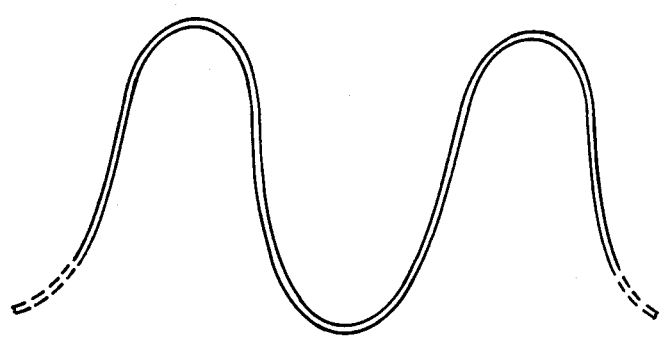
FIG. 1 is a perspective view of a filament of the invention with a sinusoidal configuration.
Figure 2:
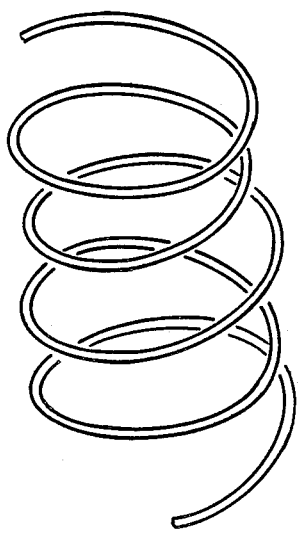
FIG. 2 is a perspective view of a filament of the invention with a coil like configuration.

What is meant by permanently set is that the fibers possess a degree of irreversibility. It is of course to be understood that the fiber or fiber assembly may be initially heat treated at the higher range of temperatures so long as the heat treatment is conducted while the coil like and/or sinusoidal configuration is in a relaxed or unstressed state and under an inert, nonoxidizing atmosphere. As a result of the higher temperature treatment, a permanently set coil like (as illustrated in FIG. 2) or sinusoidal (as illustrated in FIG. 1) configuration or structure is imparted to the fibers in yarns, tows or threads. The resulting fibers, tows or yarns having the nonlinear structural configuration which are derived by deknitting the cloth, are subjected to other methods of treatment known in the art to create an opening. In such a procedure, the yarn, tow or the fibers or filaments of the cloth are separated into a nonlinear, entangled, wool like fluffy material in which the individual fibers retain their coil like or sinusoidal configuration yielding a fluff or batting like body of considerable loft.

The fluff or batting of the invention may be utilized alone or may be provided with a suitable barrier layer of flexible sheet material or metal depending upon its desired use.

Figure 3:
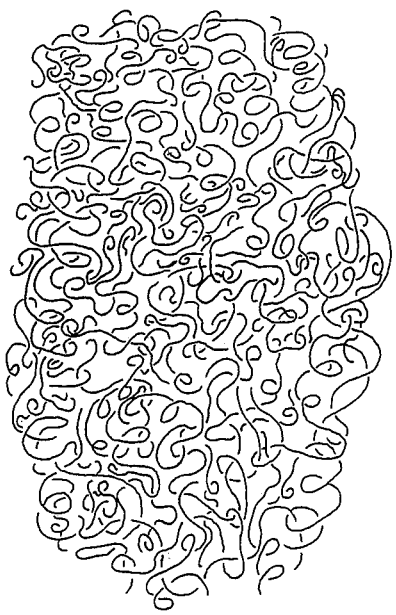
FIG. 3 is an enlarged view of a lightweight nonwoven fibrous mat of the invention.

The stabilized fibers when permanently configured in accordance with the present invention into the desired structural configuration (as illustrated in FIG. 3), e.g., by knitting, and thereafter heating at a temperature of greater than about 550 degrees C. retain their resilient and reversible deflection characteristics. It is to be understood that higher temperatures may be employed of up to about 1500 degrees C., but the most flexible and smallest loss of fiber breakage, when carded to produce the fluff, is found in those fibers and/or filaments heat treated to a temperature from about 525 and 750 degrees C.

When the precursor stabilized fiber is an acrylic fiber, the percentage nitrogen content is from about 16 to about 19%. The fibers are excellent for use where antistat properties are desirous. The structures formed therefrom are lightweight, have low moisture absorbency, good abrasive strength together with good appearance and handle.

The fibers having a carbon content of at least 85%, have superior thermal stability and flame arresting characteristics. The coil like structure in the form of a fluff (or when carded) provides an web which has good compressibility and resiliency while maintaining improved flame arresting and electrical grounding capability. The structure prepared with such fibers have particular utility in high flammability applications where spark or static generation cannot be tolerated and in areas of high heat.

The precursor stabilized acrylic filaments which are advantageously utilized in preparing the fibers of the structures are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more monovinyl units copolymerized with styrene, methylacrylate, methyl methacrylate, vinyl chloride, vinylidene chloride, vinyl pyridine, and the like. Also, the acrylic filaments may comprise terpolymers, preferably, wherein the acrylonitrile units are at least about 85 mole percent.

It is to be further understood that carbonaceous precursor starting materials may have imparted to them an electrically conductive property on the order of that of metallic conductors by heating the fiber fluff or the batting like shaped material to a temperature above about 1000 degrees C. in a nonoxidizing atmosphere. The electroconductive property may be obtained from selected starting materials such as pitch (petroleum or coal tar), polyacetylene, acrylonitrile based materials, e.g., a polyacrylonitrile copolymer (PANOX or GRAFIL-01), polyphenylene, polyvinylidene chloride resin (SARAN, a trademark of the Dow Chemical Company) and the like.

A fluff of the carbonaceous fibers of the invention may be treated with an organic or inorganic binder, needle punched, bagged or adhered to a flexible or rigid support using any of the conventional materials and techniques depending upon the use and environment of the structure. The fluff may be placed on the inside of a structure such as a fuel tank or between structural parts such as a container liner and outside skin either in the form of a mat or batting. Advantageously, various degrees of structural rigidity and stiffness of the web can be obtained by having some bonded or cured thermoplastic or thermoset material content in the web. This is preferably accomplished by blending thermoset or thermoplastic fibers with the carbonaceous fibers of the invention prior to web formation followed by curing or thermobonding, or by coating the web of fluff with thermoplastic or resinous material followed by curing. Also, other stiffening fibers such as the aramids may be blended with the carbonaceous fibers to enhance the stiffness and integrity of the web.

In addition, when the coil like or sinusoidal carbonaceous fibers and/or filaments are formed, a product is obtained which has the requisite electrical conductivity to dissipate a static buildup before it achieves a dangerous level. In addition, the material is fire or flame resistant, effectively acts as a barrier to reduce the outflow of a fluid material from the container, and has the ability to act as a flame arrester should a leaking fluid from a container ignite, thus reducing the chance of explosion.

The tightness of the web of the invention can be varied such as to provide a marked holdup of liquid or of a looseness such as to permit a high rate of flow, when such is a major factor in the handling or use. The web may also be fixed in its desired form and/or shape by cementing the juxtapositioned fibers one to the other leaving the web still very open, but of a more stable, less compressible body under load.

Figure 4:
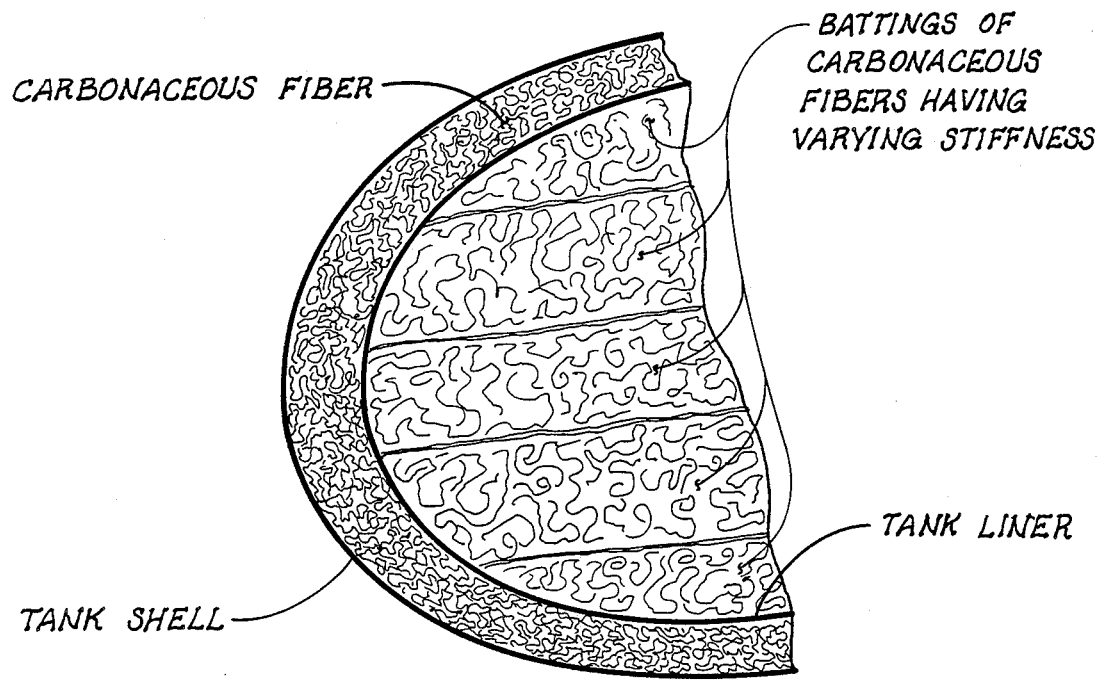
FIG. 4 is a cross-sectional view of a flammable fluid container illustrating one combination of the preferred embodiments of the present invention.

In another preferred embodiment, it is desirous to have a layered construction, such as that illustrated in FIG. 4. In this embodiment layers of the structure of the invention having varying degrees of stiffness, and hence varying degrees of fuel flow rates, are placed within the container and a nonstiffen structure is placed between the inner liner and outer wall of the container to hold up fuel leakage and act as a flame arrester, should the container rupture.

If desired, the structure may also comprise a thermoplastic polymeric fiber, such as polyester fiber or the like, in order to provide densification, shape retention and extra rigidity of the structure.

It is understood that all percentages as herein utilized are based on weight percent.

Exemplary of the present invention are set forth in the following examples:

EXAMPLE 1

In this example a fluff structure was prepared which is particularly useful in antislosh and flame arresting applications where electrical grounding of the structure is required.

Following the procedure disclosed in U.S. Patent Application Ser. No. 856,305, a 3K OPF (i.e., oxidized polyacrylic fiber having 3000 filaments) PANOX stabilized tow was knit on a Singer flat bed knitting machine at a rate of 4 stitches/cm and was then heat treated at a temperature of 950 degrees C. The cloth was deknitted and the tow (which had a coil elongation or reversible deflection ratio of greater than 2:1) was cut into 7.5 cm length staple. The cut staple was then carded on a Platt Miniature carding machine to produce a wool like fluff having fibers ranging from 2.5 to 6.5 cm in length. The wool like fluff had a high electrical conductivity (a resistance less than 104 ohms per inch) over any length of up to 60 cm tested.

In lieu of PANOX, there may be employed stabilized pitch based fibers or a copolymer or terpolymer of polyacrylonitrile.

EXAMPLE 2

In this example a fluff structure was prepared which is particularly useful in antislosh and flame arresting applications where electrical grounding of the structure is required.

In a similar manner to Example 1, a portion from the same knit sock was heat treated at a temperature of 1550 degrees C. The cloth itself and the deknitted tow had a very high electrical conductivity. On carding 15 cm lengths of cut tow, a fluff containing fibers was obtained which had fiber lengths of 2.54 to 9.5 cm (1 to 3 inches) with average lengths of 5 cm (2 inches). Thus, carding of a deknitted continuous filament tow knitted fabric which has been subjected to a temperature of above 1000 degrees C. is still capable of producing a wool like fluff product.

EXAMPLE 3

In this example a structure effective as antislosh, antistat and flame arresters capable of arresting flame fronts from gasoline or naphtha vapors was produced as follows:

Using the procedure of Example 1, a 6K OPF tow was knit into a fabric, the fabric treated at 650 degrees C. until it was thermally set and thereafter deknit to produce the nonlinear carbonaceous fiber tow and then cut into staple of about 14–17 cm nominal lengths. This so cut staple was opened on a Shirley opener then further processed on a Rando Webber machine, an air laying system for producing nonwoven batting. The feed plate-combing roll were spaced at 12/1000 inch and dispersed into the chamber using a 1200 rpm setting on the fan. Approximately 50% by weight of 6 denier polyester fiber was blended with opened nonlinear carbonaceous fibers in the preblending section of the Rando Webber. The resulting batting was passed through a Benz hot air oven held at a temperature of 260 degrees C. at a rate of 2 m/min resulting in an oven time of about 1 minute. This was sufficient to soften the polyester fibers to achieve a light bonding of the carbonaceous fibers in the web. This structure had excellent antistat and stiffness properties, especially useful in applications where good fuel flow rates are required.

EXAMPLE 4

A. In a similar manner described in Example 3, the cut fibers were treated in a Shirley opener and then a Rando Webber air laying system, but with approximately 1% low melting EAA (ethylene acrylic acid) binder fibers added.

B. The fluff and/or batting of part A were partially coated with epoxy resins to form structures of varying rigidity. The fluff or batting was placed on an expanded metal screen in a laboratory hood. A series of samples designated as Samples A–E were sprayed on all sides with a novolac epoxy resin (D.E.N.* 438, *a trademark of The Dow Chemical Company) as a 20% solution in acetone to which had been added (in a ratio of 28 to 100 of the amount of the epoxy used) methylene dianiline as hardening agent. Sample F was sprayed on all sides with an aliphatic diepoxide resin (D.E.R.* 732) as a 20% solution in methyl ethyl ketone to which had been added (in a ratio of 31 to 100 of the amount of the epoxide used) methylene dianiline as hardening agent. After driving the acetone out of each sample under a heat lamp, the coated sample was placed in an oven at 105 degrees C., then to 125 degrees C., whereat it remained for approximately 1 hr. The oven temperature was raised to 170 degrees C. and held thereat for an additional hour. Upon cooling, the each sample was weighed to determine the percent resin content of each sample structure. Electrical resistance measurements were made on each sample. These results are summarized in Table I as follows:

TABLE I

| Sample | Epoxy/Fiber ratio | Surface R (megaohm/sq.) |
|---|---|---|
| A | 3.12 to 1 | 300 |
| B | 1.26 to 1 | 300 |
| C | 1.31 to 1 | 200 |
| D | 1.53 to 1 | 200 |
| E | 0.35 to 1 | 200 |
| F | 1.50 to 1 | 200 |

The stiffness and rate of fuel flow through the battings was followed the relative amount of epoxy coating on each batting. Batting A was the stiffest and had the best fuel flow rate whereas Batting E was the softest and least stiff and had a poorer fuel flow rate. This example also surprisingly shows that the battings retain good antistat properties over a large coating range of epoxy coating.

EXAMPLE 5

The batting of Example 4 was processed on a Hunter Fiber Locker to obtain a mechanical bonding by the needle punching process. The resulting structure was suitable as an antistatic, antislosh and flame arresting liner structure in a container for flammable fluids.

EXAMPLE 6

Following the procedure disclosed in U.S. Patent Application Ser. No. 856,305, a 6K OPF (i.e., 6000 filament oxidized polyacrylic fiber) PANOX stabilized tow was knit into a plain jersey fabric on a flat bed knitting machine at a rate of 3 stitches/cm and was then heat treated at a temperature of 550 degrees C. The cloth was deknitted and the tow (which had a coil elongation or reversible deflection ratio of greater than 1.2:1) was cut into 7.5 cm length staple. The cut staple was then carded on a Platt Miniature carding machine to produce a wool like fluff having fibers ranging from 6.5 to 7.5 cm in length. The wool like fluff had a measurable electrical conductivity (a resistance less than 125K ohms per 2.5 cm). A small portion of the resulting fluff (0.14 g) was placed in a 75 ml laboratory wide mouth bottle. No compression was used to place more than the free volume of the fluff into the bottle. The bottle was then approximately 90% filled with 55 g of a highly refined liquid hydrocarbon (kerosene) and sealed. The electrical resistance across 2.5 cm of kerosene was greater than 20 megaohms with no fluff present and less than 125K ohms with fluff present (This value of less than 125K ohms across 2.5 cm is well within the antistat range). The bottle was shaken and inverted several times and trapping of air bubbles and a significant antisloshing effect due to the fluff was observed. During the inversion, the bat compressed about 10%. The bottle was opened and the kerosene poured from the bottle freely. This example showed that the fluff structure is free supporting in a container of short head height (about 7.5 cm), and is effective as an antislosh and antistat structure.

EXAMPLE 7

This example was run to show what effect increasing the density of a structure lightly coated with epoxy resin would have on the amount of liquid retained by the structure.

A 0.48 g portion of sample E from Example 4B was loaded into a 125 ml bottle and the bottle filled about 100.12 g with kerosene. The bottle was turned upside down and the kerosene was allowed to flowed out for about 30 seconds. The fuel which flowed from the bottle weighed 91.65 g. Thus, 8.47 grams was retained in the bottle. A second bottle was filled with 0.99 grams of the coated sample and the bottle filled with 96.6 grams of kerosene. The bottle was turned upside down and kerosene allowed to run out for 30 seconds and 79.71 grams of fuel flowed from the bottle. Thus, 16.89 grams or 17.3% by weight was retained by the structure in the bottle. This example showed that when the structure is lightly coated with epoxy, increasing the density of the structure increases the amount of liquid retained by the structure.

EXAMPLE 8 and 9

These examples were run to show the effect of stiffness caused by coating the fiber structure verses the fuel flow characteristics.

In the first experiment, 4.63 g of uncoated batting of Example 4 A was placed in a 125 ml widemouthed laboratory bottle to which was added 85 g of kerosene. The bottle containing the uncoated structure of the invention was rotated and shaken several times. The bottle was opened, inverted for 30 seconds, and 1.7 g, or 2 percent, of fuel flowed out. Approximately 98 percent of the kerosene was retained by the structure.

In the second experiment, 4.63 g of coated batting of Sample F of Example 4 B was placed in a 125 ml widemouthed laboratory bottle to which was added 85.57 g of kerosene. The bottle containing the coated structure of the invention was rotated and shaken several times. The bottle was opened, inverted for 30 seconds, and 82.46 g, or 95.3 percent, of fuel flowed out. Only less than 5 percent of the kerosene was retained by the stiffened coated structure.

These experiments show that the fuel retention is a function of the stiffness of the structure and not the mass of the structure per se. The uncoated example would be useful as a tank liner to retard spillage in the case of tank penetration or rupture whereas the coated example would be useful where antislosh, flame arresting and antistat properties, and good flow rates are required.

EXAMPLES 10-13

In another series of examples, the flow rates and antisloshing characteristics of various embodiments of the invention were demonstrated and compared to a currently used foam structure. A nominal 6 inch OD PYREX glass tube 6 feet long was sealed at both ends with removable plates having valves fitted in the plates. The tube was suspended at its central portion in a trunnion assembly so that the entire tube could be rocked and/or rotated 360 degrees. This tube was packed with the each example of material to be tested for slosh and drain characteristics.

The materials tested in this series of examples were 600 g of standard blue polyether urethane reticulated foam, a 400 g sample of example 4 A, and Samples A(275 g), B(356 g), and D(300 g) of Example 4 B, the latter four examples containing embodiments of the material of the invention. The sample of Example 4 A had no stiffener coating whereas the remaining samples had different amounts of coatings as described in Table I above. The tube was filled with 31.5 l kerosene and partial drain rates measured. The tube was then rotated 180 degrees to measure the relative antislosh characteristics for each example. "Time 1" in Table II represents the time in seconds for 80% of 10.5 l of kerosene to move from the top to the bottom of the 6 ft tube whereas "Time 2" represents the time in seconds for 90% of the 10.5 L1 (33% full tank) of kerosene to slosh back from top to bottom after rotation. On a total 31.5 l drain test Example 13 retained 0.35 l of fluid or only 1.1% fuel retention.

TABLE II

| Example No. | Sample | Fraction Drained | Time (sec) | Slosh Test (sec) Time 1 | Time 2 |
|---|---|---|---|---|---|
| Comparative Sample | Blue Foam | 0.33 | 60 | — | — |
| | | 0.67 | — | 60 | 80 |
| 10 | 4A | 0.33 | >2000 | | |
| | | 0.67 | | >1800 | |
| 11 | A | 0.33 | 26 | | |
| | | 0.67 | 71 | 48 | 74 |
| 12 | B | 0.33 | 35 | | |
| | | 0.67 | 105 | 102 | 115 |
| 13 | C | 0.33 | 32 | | |
| | | 0.66 | 88 | — | — |
| | | 1.00 | 160 | | |

EXAMPLE 14

A 6K linear tow of PANOX oxidized polyacrylic fiber (OPF) was heat treated at 650 degrees C. similar to the heat treatment described in Example 3. This heat set linear tow was cut into 7.5 cm staple length, opened with turbulent air and blended with 75% of 6 denier polyester fiber and made into a 2.5 cm thick batting having a density of approximately 9 kg/m$^3$. This batting was then thermally bonded in a Benz hot air oven in a manner similar to that of Example 3. This material passed the vertical burn test as described in 14 CFR 25.853b herein incorporated by reference and had an electrical resistance of less than 1 megaohm per 2.5 cm (In the effective antistat range). This material was shown to be effective as a flame retardant material useful as an antislosh, antistat flame arresting structure.

EXAMPLE 15

A 6K linear tow of PANOX oxidized polyacrylic fiber (OPF) was heat treated at 650 degrees C. similar to the heat treatment described in Example 3. This heat set linear tow was cut into 7.5 cm staple length, opened with turbulent air and blended with 60% of 6 denier high melting polyester fiber, 15% low melting polyester binder fiber, and made into a 2.5 cm thick batting having a density of approximately 9 kg/m$^3$. This batting was then thermally bonded in a Benz hot air oven in a manner similar to that of Example 3, with the exception that the temperature of the oven was set in between the melting points of the regular polyester fiber and the lower melting polyester binder fiber. This allowed only the binder fiber to melt and created a batting with a lower density and higher loft than that made in Example 14. This material passed the vertical burn test as described in 14 CFR 25.853b herein incorporated by reference and had an electrical resistance of less than 1 megaohm per 2.5 cm (In the effective antistat range). This material was shown to be effective as a flame retardant material useful as an antislosh, antistat flame arresting structure.

What is claimed is:

1. A fibrous flame arresting structure for use in or with containers holding flammable fluids comprising a multiplicity of irreversibly heat set carbonaceous fibers having an LOI value greater than 40 in an amount effective for arresting a flame front.

2. The structure of claim 1 wherein said fibers have a resistance greater than $10^7$ ohms per inch on a 6K tow formed from fibers having a diameter of 7–20 microns and are nonelectrically conductive.

3. The structure of claim 1 wherein said fibers have a resistance of about $10^7$–$10^4$ ohms per inch formed from fibers having a diameter of 7–20 microns and are electrically conductive.

4. The structure of claim 1 wherein said fibers have a resistance less than $10^4$ ohms per inch on a 6K tow formed from fibers having a diameter of 7–20 microns and possess antistatic characteristics.

5. The structure of claim 1 wherein said fibers form an entangled web and said web is bonded with sufficient thermoplastic or thermoset material to produce a structural rigidity and stiffness to maintain an open web shape in the presence of a liquid.

6. The structure of claim 5 wherein said web permits a high rate of flow of liquid.

7. The structure of claim 5 wherein the web is fixed in its desired form and/or shape by bonding the juxtapositioned fibers one to another.

8. The structure of claim 1 comprising fibers having a carbon content of less than 85%.

9. The structure of claim 1 wherein said fibers contain a binder.

10. The structure of claim 1 wherein said fibers are derived from stabilized acrylic fibers.

11. The structure of claim 1 wherein said fibers are derived from stabilized pitch fibers.

12. The structure of claim 1 wherein said carbonaceous fiber content is 25% or greater and containing polyester as a binder fiber.

13. The structure of claim 1 wherein said carbonaceous fiber content is 25% or greater and containing cured epoxy as a binder.

14. An antislosh, flame arresting structure for use in or with containers holding flammable fluids comprising a multiplicity of heat set carbonaceous fibers having an LOI value greater than 40 in an amount effective for preventing sloshing of the fluids and capable of arresting a flame front, wherein said fibers are nonlinear.

15. The structure of claim 14 wherein said fibers have a resistance greater than $10^7$ ohms per inch on a 6K tow formed from fibers having a diameter of 7–20 microns and are nonelectrically conductive.

16. The structure of claim 14 wherein said fibers have a resistance of about $10^7$–$10^4$ ohms per inch formed from fibers having a diameter of 7–20 microns and are electrically conductive.

17. The structure of claim 14 wherein said fibers have a resistance less than $10^4$ ohms per inch on a 6K tow formed from fibers having a diameter of 7–20 microns and possess antistatic characteristics.

18. The structure of claim 14 comprising an entangled web of continuous or staple fibers having sufficient thermoplastic or thermoset content to produce a structural integrity to maintain an open web shape in the presence of a liquid.

19. The structure of claim 14 comprising an entangled web of continuous or staple fibers having sufficient thermoplastic or thermoset content to produce a structural integrity to maintain an open web shape in the presence of a liquid wherein the web permits a high rate of flow of liquid.

20. The structure of claim 14 comprising an entangled web of continuous or staple fibers having sufficient thermoplastic or thermoset content to produce a structural integrity to maintain an open web shape in the presence of a liquid wherein the web is fixed in its desired form and/or shape by bonding the juxtapositioned fibers one to another.

21. The structure of claim 14 wherein said carbonaceous fiber content is 25% or greater and containing cured epoxy as a binder.

22. The structure of claim 1 wherein said carbonaceous fiber content is 25% or greater and containing polyester as a binder fiber.

23. The structure of claim 14 wherein said fibers have a sinusoidal configuration.

24. The structure of claim 14 wherein said fibers have a coil like configuration.

25. The structure of claim 14 wherein said fibers having a reversible deflection ratio of greater than 1.2:1, and an aspect ratio greater than 10:1.

* * * * *

UNITED STATES PATENT AND TRADEMARK OFFICE
CERTIFICATE OF CORRECTION

PATENT NO. : 4,844,974
DATED : July 4, 1989
INVENTOR(S) : Francis P. McCullough, Jr., et al It is certified that error appears in the above-identified patent and that said Letters Patent is hereby corrected as shown below:

Column 1, Line 45; change "tank's" to --tanks'--.

Column 4, Line 52; change "posses" to --possess--.

Column 6, Line 7; change "an" to --a--.

Column 6, Line 38; change "the" between "of" and "Dow" to --The--.

Column 8, Line 54; delete "the" between "cooling," and "each".

Column 9, Line 59; change "flowed" to --flow--.

Column 10, Line 5; change "EXAMPLE" to --EXAMPLES--.

Column 10, Line 47; delete "the" at the beginning of the line before "each".

Column 10, Line 55; change "remainding" to --remaining--.

Signed and Sealed this

Twenty-third Day of October, 1990

Attest:

HARRY F. MANBECK, JR.

*Attesting Officer*      *Commissioner of Patents and Trademarks*